No. 716,200. Patented Dec. 16, 1902.
M. W. DAY.
CONTROLLING ELECTRIC MOTORS.
(Application filed Nov. 2, 1899.)
(No Model.)
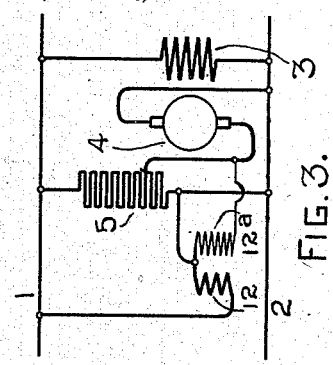
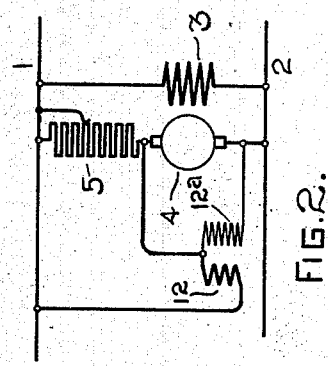
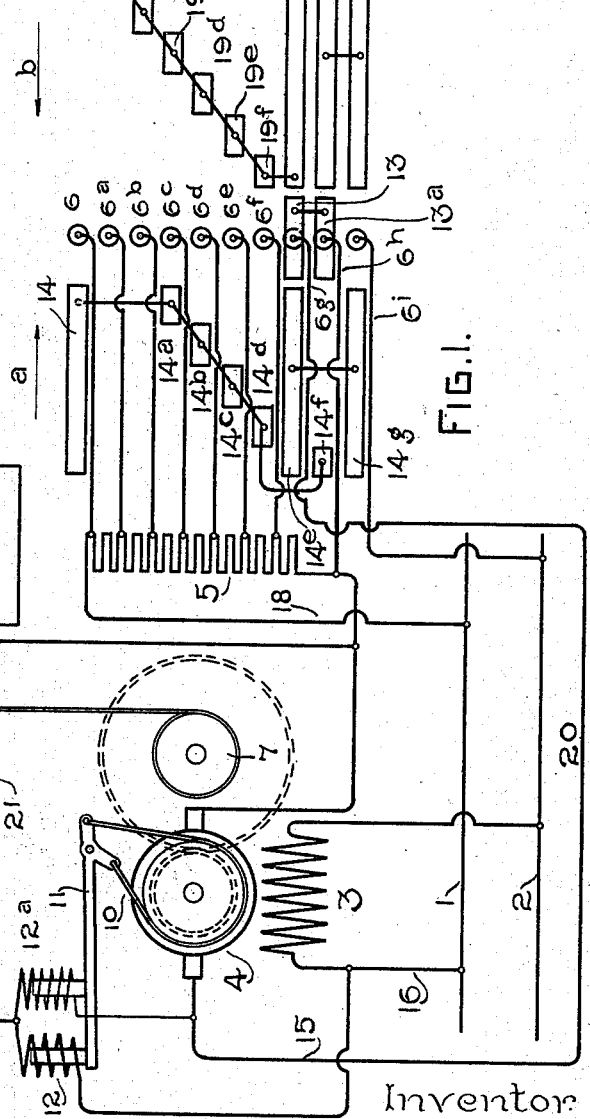
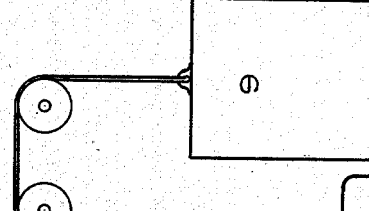
Witnesses.
Inventor.
Maxwell W. Day.
by Albert G. Davis
Att'y

UNITED STATES PATENT OFFICE.

MAXWELL W. DAY, OF SCHENECTADY, NEW YORK, ASSIGNOR TO GENERAL ELECTRIC COMPANY, A CORPORATION OF NEW YORK.

CONTROLLING ELECTRIC MOTORS.

SPECIFICATION forming part of Letters Patent No. 716,200, dated December 16, 1902.

Application filed November 2, 1899. Serial No. 735,641. (No model.)

*To all whom it may concern:*

Be it known that I, MAXWELL W. DAY, a citizen of the United States, residing at Schenectady, county of Schenectady, State of New York, have invented certain new and useful Improvements in Controlling Electric Motors, of which the following is a specification.

This invention relates to the control of electric motors and of devices operated thereby, and has particular reference to the methods employed for speed retardation of motor-driven apparatus having considerable inertia. It has hitherto found its principal application in connection with electrically-operated hoists, but is capable of being used in other driven devices where quick stops are necessary and where the apparatus has great inertia or tendency to move after the motor has been checked in speed.

In carrying out my invention I provide a controller of any standard type—as, for example, a rheostatic controller—arranged to govern one or more motors operating the driven mechanism, and I also provide connections whereby the motor or motors may be short-circuited to quickly retard the speed of the mechanism by the ordinary and well-known process of electric braking; but I find in practice that an electric brake of this description, though extremely useful in reducing the speed of the driven mechanism, is not adapted to absolutely arrest this speed, since the braking force is directly proportional to the speed and disappears when the speed becomes very small. This is particularly objectionable in hoists or elevators from the tendency of the car to settle after the motor has been cut out of circuit. I therefore provide in addition a mechanical brake and arrange means whereby the mechanical brake is actuated at certain controller positions.

Having thus briefly indicated the object of my invention, I will now proceed to explain it in detail, with reference to the attached drawings, and refer to the claims hereto annexed to define its exact scope.

In the drawings, which diagrammatically illustrate the invention, Figure 1 is a general view of a system embodying my improvements applied to the operation of electric hoists. Fig. 2 is a diagram of circuits in the hoisting position. Fig. 3 is a diagram of circuits in the lowering position, and Fig. 4 is a detail of the brake-magnets.

Referring more particularly to Fig. 1, 1 2 are the constant-potential mains supplying the hoisting-motor. The field-magnets 3 may be connected permanently in shunt to these mains, and the armature 4 is connected to the contacts $6^g$ and $6^h$ of the controller. This armature is geared to a drum 7, around which passes the rope 8 of the hoist 9. On a pulley connected to the armature is fixed a band-brake 10, operated by a lever 11, which lever if left free will fall to the position shown and apply the brake 10. The lever carries at one end a pair of cores 22 $22^a$, which are illustrated diagrammatically in Fig. 1 and are shown in their preferred form in Fig. 4. These cores move within fixed solenoids 12 $12^a$, and a yoke 23 serves to nearly close the magnetic circuit when the cores 22 $22^a$ are drawn into the solenoids. The two solenoids 12 $12^a$ are connected in various ways, as will be more fully shown hereinafter. When they are put on open circuit, the weight of the apparatus is sufficient to apply a brake 10. If, however, current is passed into one of the solenoids, it will be obvious that that particular solenoid will be energized, the cores 22 $22^a$ will be attracted, and the brake will be released. The controller is shown in the off position, in which position contacts $6^g$ $6^h$ bear on the segments 13 $13^a$, which are connected together, as shown. No other circuit connections are made, and in this position it will be seen that the motor-armature is directly short-circuited on itself and the coils 12 $12^a$ are deënergized, so that both the electrical and mechanical brakes are applied. If now it is desired to cause an upward movement of the hoist 9, the controller-segments are thrown in the direction of the arrow $a$ until the contact $6^c$ bears on the segment $14^a$. In this position, which is represented diagrammatically in Fig. 2, current flows from the main 1 to the contact 6, thence to the segment 14, through cross connection to the segment $14^a$, the contact $6^c$, thence through a portion of the resistance 5 to the right-hand brush of the motor-armature, through the motor-armature and the wire 15 to the contact 6ᵍ, segment 14ᵉ, cross connection, segment 14ᵍ, and contact 6ⁱ to the main 2.

At the lower end of the resistance 5 a connection leads through the wire 21 to a point between two solenoids 12 12ª. The solenoid 12 is also connected through the wire 17 to the main 1, while the solenoid 12ª is connected to the contact 6ᵍ, which, as has been seen above, is in this position connected to the main 2. This connection is diagrammatically illustrated in Fig. 2, in which the resistance 5 is connected in series with the motor-armature across mains, while the two solenoids 12 12ª are connected in such a way that the solenoid 12 shunts the resistance 5, while the solenoid 12ª shunts the armature 4. Before the motor starts in lifting the hoist substantially the whole electromotive force of the mains will be consumed by the resistance 5 and the coil 12 will be strongly energized, while the coil 12ª will receive practically no magnetization whatever, being short-circuited by the armature; but as the motor begins to attain speed its increase of counter electromotive force shunts an increasing amount of current through coil 12ª. A further travel of the controller in the same direction will gradually cut out the resistance 5 until in the last position the resistance is entirely short-circuited by the contact 6ʰ bearing on the segment 14ᶠ. This represents the full-speed position of the hoist, and in this position the whole electromotive force of the mains is consumed in the armature 4. The coil 12 now ceases to perform its function of holding up the arm 11; but the coil 12ª, receiving the full potential of the mains, is sufficient to prevent the lever-arm from dropping. I prefer to wind the coil 12ª with finer wire than the coil 12, which has the effect of reducing the amount of energy lost in the coils in the full-speed position. This is not objectionable, since in this position the cores 22 22ª are brought very close to the yoke 23 and the magnetic circuit is of comparatively low reluctance, so that only a small amount of magnetizing force is needed to prevent the brake from being applied. If now it is desired to stop the hoist suddenly, the controller is brought to the position shown in Fig. 1. This, as above explained, short-circuits the motor-armature. As the motor is now supposed to be running at high speed, the electric brake action is very powerful and the hoist is stopped very quickly. When the motor acts thus as a generator, coil 12ª holds the friction-brake released, but sets it and brings the motor to a dead-stop when the motor slows down and the current it is generating declines. The descent of the hoist is caused and regulated by a movement of the controller in the direction of the arrow b. Suppose the contact 6ᶠ to stand on the segment 19ᶠ. Current flows from the main 1 through the resistance 5 to the contact 6ʰ, segment 19ʰ, cross connection, and through the segment 19ⁱ to the contact 6ⁱ and the main 2. The motor-armature 4 is shunted around a portion of this resistance, as indicated in Fig. 3. This will be seen more readily when it is noticed that current can flow from the main 1 through nearly all of the resistance 5 to the contact 6ᶠ, segment 19ᶠ, cross connection, segment 19ᵍ, contact 6ᵍ, wire 15, through the motor-armature, and thence to the segment 19ʰ and through the cross connection to the segment 19ⁱ to the contact 6ⁱ, and to the main 2. It will thus be seen that the motor-armature forms a path alternative to the lower portion of the resistance 5, and also it will be seen that the motor-armature is closed on itself through the lower portion of the resistance, thus permitting it to run only at slow speed. The connections of the brake-solenoids are in this position altered. Current is still able to flow through the solenoid 12 in the same direction as before; but it passes through the wire 21 directly to main 2 by way of the contact 19ʰ, &c. Current can also pass from the main 1 through the resistance 5 in the path above described to the point where the said resistance is connected to the motor-armature. As will be apparent upon inspection of Figs. 1 and 2, the direction of current through the armature is reversed, and therefore its direction through coil 12ª, which shunts the armature, is also reversed, and the coil now tends to demagnetize the cores 22 22ª. Further travel of the controller in the direction indicated simply causes the motor-armature to be shunted around more and more of the resistance 5, until in the last position it is connected directly across the mains. In this position the coil 12ª would demagnetize the cores 22 22ª and cause the brake to be applied if the coils were of equal resistance and of the same number of turns; but as the coil 12ª is of finer wire its magnetizing power is small, and the cores retain enough magnetism to hold the brake off. It will be seen that in all these lowering positions the motor 4 may run either as a generator or as a motor. If it runs as a motor, it is fed from the drop of potential across part or all of the resistance 5, while if it runs as a generator it is short-circuited through part or all of the resistance 5. The question of whether it will at any particular time run as a generator or a motor is determined simply by the relation between the load on the hoist and the friction. I am by the connections shown enabled to operate the mechanical brake by the controller without the necessity of special contacts.

What I claim as new, and desire to secure by Letters Patent of the United States, is—

1. A combined magnetic and friction brake for electrically-driven devices, comprising connections for short-circuiting the propelling-motor when the supply-circuit is broken, a friction-brake, a coil holding the latter released when the circuit is closed, and an auxiliary releasing-coil controlled by current in the short circuit.

2. A combined magnetic and friction brake for electrically-propelled devices, comprising connections for putting the motor on short circuit when the supply-circuit is broken, a brake-releasing coil in series with the motor, and an auxiliary brake-releasing coil in shunt to the armature.

3. The combination with an electric motor, of a controller, a variable resistance governed thereby to vary the speed of the motor, contacts on the controller for putting the motor on short circuit when the supply-circuit is broken, a friction-brake, a brake-releasing coil in shunt to the resistance, and an auxiliary releasing-coil in shunt to the armature.

4. The combination with a hoist, of an electric motor operating the same, a controller, a variable resistance governed thereby to vary the speed of the motor, contacts on the controller for putting the motor on short circuit to establish a magnetic brake when the supply-circuit is broken, an auxiliary friction-brake, a releasing-coil therefor in shunt to the resistance, controller-contacts for putting the armature in series with the resistance in lifting, and in parallel thereto in lowering, and an auxiliary brake-releasing coil in shunt to the armature.

5. The combination with a hoist, of an electric motor operating the same, a variable resistance, a controller for regulating the same to change the motor-speed, a friction-brake, a releasing-coil operated when the motor-circuit is closed, and an auxiliary releasing-coil connected by the controller when the hoist descends, in a shunt around the regulating resistance.

In witness whereof I have hereunto set my hand this 28th day of October, 1899.

MAXWELL W. DAY.

Witnesses:
BENJAMIN B. HULL,
MABEL E. JACOBSON.